US 12,111,269 B2

(12) United States Patent
Balducci

(10) Patent No.: US 12,111,269 B2
(45) Date of Patent: Oct. 8, 2024

(54) APPARATUS AND METHOD FOR INSPECTING AN OBJECT

(71) Applicant: SACMI COOPERATIVA MECCANICI IMOLA SOCIETA' COOPERATIVA, Imola (IT)

(72) Inventor: Massimo Balducci, Imola (IT)

(73) Assignee: SACMI COOPERATIVE MECCANICI IMOLA SOCIETA' COOPERATIVA, Imola (IT)

( * ) Notice: Subject to any disclaimer, the term of this patent is extended or adjusted under 35 U.S.C. 154(b) by 214 days.

(21) Appl. No.: 17/435,925

(22) PCT Filed: Mar. 4, 2020

(86) PCT No.: PCT/IB2020/051845
§ 371 (c)(1),
(2) Date: Sep. 2, 2021

(87) PCT Pub. No.: WO2020/178758
PCT Pub. Date: Sep. 10, 2020

(65) Prior Publication Data
US 2022/0317059 A1    Oct. 6, 2022

(30) Foreign Application Priority Data

Mar. 5, 2019 (IT) ........................ 102019000003169

(51) Int. Cl.
*G01N 21/90* (2006.01)
*B65B 29/02* (2006.01)
(Continued)

(52) U.S. Cl.
CPC ....... *G01N 21/9081* (2013.01); *B65B 29/022* (2017.08); *B65B 43/52* (2013.01);
(Continued)

(58) Field of Classification Search
CPC ......... G01N 21/9081; G01N 2021/845; G01N 2021/8472; G01N 25/72;
(Continued)

(56) References Cited

U.S. PATENT DOCUMENTS 6,353,197 B1 * 3/2002 Ulrichsen ............... B07C 5/344
                                                              250/225
6,593,001 B1 * 7/2003 Watanabe ............... B41C 1/147
                                                              428/464
(Continued)

FOREIGN PATENT DOCUMENTS

DE      102011050073 A1    11/2012
EP          1055115 B1      2/2008
(Continued)

OTHER PUBLICATIONS

Chinese Office Action for Chinese Patent Application No. 202080019132.2, Dated Feb. 2, 2024, 12 Pages.

*Primary Examiner* — David P Porta
*Assistant Examiner* — Gisselle M Gutierrez
(74) *Attorney, Agent, or Firm* — Pearne & Gordon LLP; Bryan M. Gallo

(57) ABSTRACT

An apparatus (1) for inspecting an object, where the object is made up of a first layer of plastic material and a second layer of EVO or EVOH and has a base wall (A) and a side wall (B) which is inclined relative to the base wall (A), comprises: an inspection zone (10) in which the object can be placed for inspection: a conveyor (12) for feeding the object to the inspection zone (10) along a feed plane (P): an imaging device (14) configured to view the object positioned in the inspection zone (10) and to generate an image (143) of the object: a processor (151), configured to process the image (143), to inspect the second layer. The conveyor (12) is configured to dispose the object in the inspection zone (Continued)

(10) with the base wall (A) positioned according to a predetermined orientation relative to the feed plane (P).

18 Claims, 6 Drawing Sheets

(51) Int. Cl.
*B65B 43/52* (2006.01)
*G01N 21/84* (2006.01)

(52) U.S. Cl.
CPC ............... *G01N 2021/845* (2013.01); *G01N 2021/8472* (2013.01)

(58) Field of Classification Search
CPC .... G01N 2021/8411; G01N 2021/8438; B65B 29/022; B65B 43/52; B65B 43/46; B65B 57/04; B07C 5/342
See application file for complete search history.

(56) References Cited

U.S. PATENT DOCUMENTS

| | | |
|---|---|---|
| 9,613,414 B2 | 4/2017 | Scharer et al. |
| 2009/0200458 A1* | 8/2009 | Kashima .............. G01N 1/4022 250/281 |
| 2010/0155574 A1* | 6/2010 | Choi ..................... G01J 1/08 250/205 |
| 2011/0220797 A1* | 9/2011 | Hoelter ................. G01J 5/0875 264/2.7 |
| 2012/0200849 A1* | 8/2012 | Balducci ............ G01N 21/8806 356/240.1 |
| 2014/0077081 A1* | 3/2014 | Ohama .................. G01N 21/55 250/338.1 |
| 2014/0177932 A1 | 6/2014 | Milne et al. |
| 2015/0049182 A1* | 2/2015 | Scharer .............. G01N 21/9054 348/91 |
| 2015/0371814 A1* | 12/2015 | Kanno .............. H01L 21/67248 250/443.1 |

FOREIGN PATENT DOCUMENTS

| | | |
|---|---|---|
| EP | 2453225 A2 | 5/2012 |
| EP | 2605004 B1 | 4/2015 |
| EP | 2853887 B1 | 8/2017 |
| JP | 200314705 A | 11/2000 |
| JP | 2005241488 A | 9/2005 |
| JP | 2006184177 A | 7/2006 |

* cited by examiner

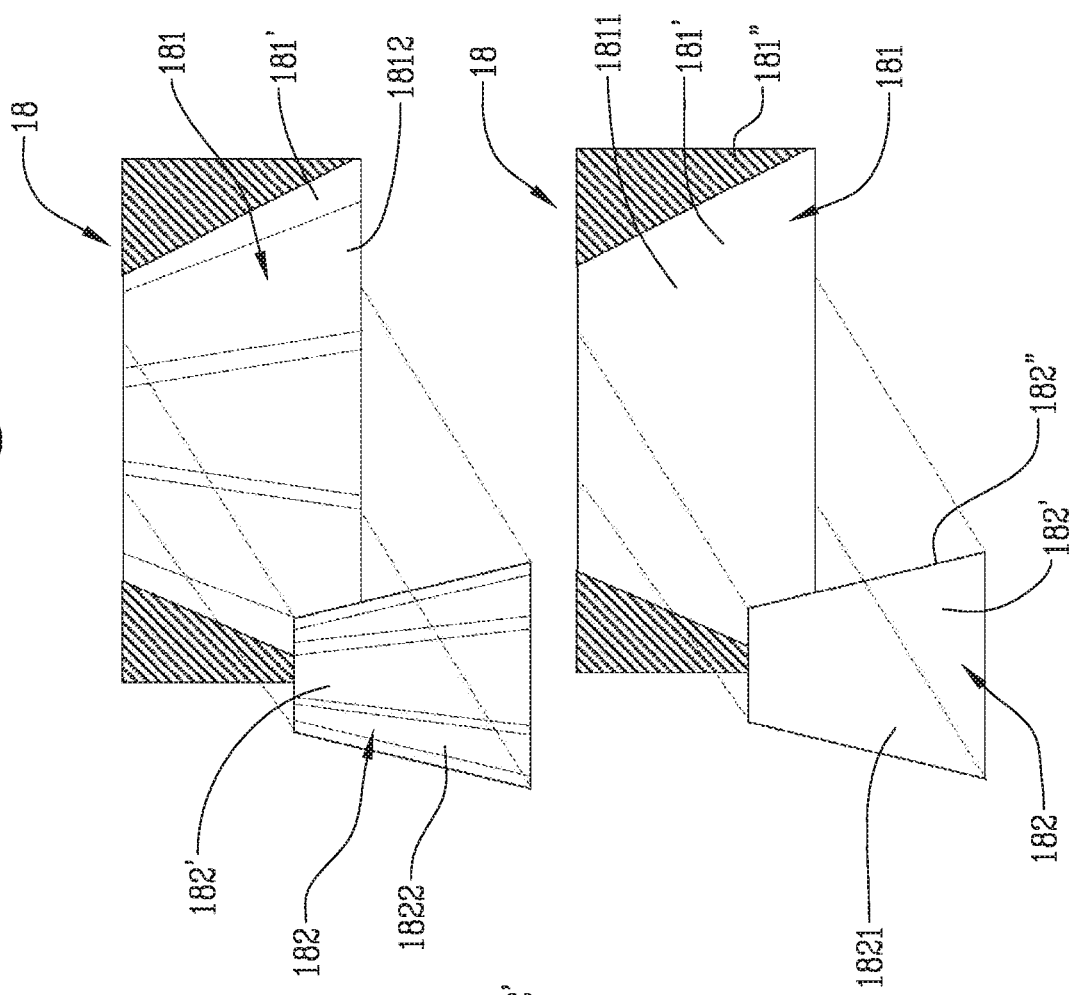
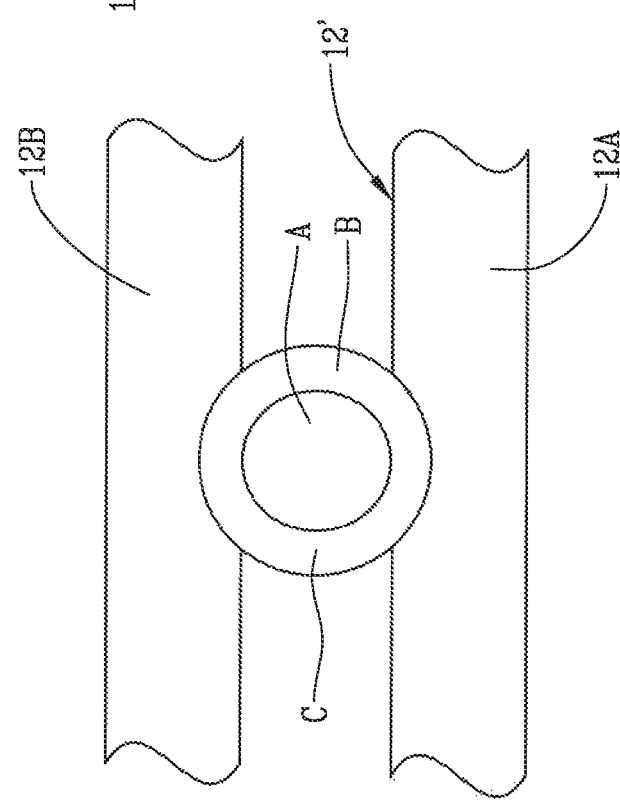

APPARATUS AND METHOD FOR INSPECTING AN OBJECT

TECHNICAL FIELD

This invention relates to an apparatus and a method for inspecting an object. In particular, in some industrial applications, objects need to be inspected for the presence of particular materials making up the objects and having specific functions, so as to ensure that the expected function is effectively fulfilled when the objects are used.

BACKGROUND ART

For example, in some industrial situations, the object is a pod (capsule) used to store a predetermined quantity of coffee to be consumed at a later stage. The pod must guarantee the integrity of the product it contains, in particular with regard to flavour. Since coffee can lose its flavour properties on account of oxidation, it is essential to provide pods that are impervious to oxygen.

DISCLOSURE OF THE INVENTION

For this purpose, solutions are known where the pod is composed of at least two layers: a first layer of plastic material which is permeable to oxygen and a second layer made of EVO or EVOH which is impermeable to oxygen.

Consequently, since the oxygen impermeability property is uniquely correlated with the presence and conditions of the second layer, inspection apparatuses and methods for diagnosing the second layer have been developed.

In this technical context, solutions are known in which the object is fed along a feed plane to an inspection zone where the object is visible to an infrared camera. In these solutions, the object, whose approximate temperature is known, emits rays having a wavelength that is typical of the material (in the specific case of EVOH, the wavelength of the emission is between 2 μm and 5 μm) and captured by the infrared camera.

The camera reconstructs an infrared image of the object as a function of the infrared radiation captured. Lastly, analysing the image makes it possible to determine the conditions of the EVOH for each point (each zone) of the object.

Solutions of this kind are described, for example, in document EP2605004B1.

In these systems, however, the conveyor might position the object incorrectly, thus negatively affecting the repeatability and reliability of the inspection.

Moreover, the walls of the object might be inclined in such a way that the camera cannot capture the emissions of the object. Under these conditions, the inspection is not reliable because only part of the object is inspected.

The aim of this invention is to provide an apparatus and a method for inspecting an object to overcome the above mentioned disadvantages of the prior art.

This aim is fully achieved by the apparatus and method of this disclosure as characterized in the appended claims.

According to an aspect of it, this disclosure provides an apparatus for inspecting an object. The object to be inspected is composed of a first layer (at least one) and a second layer. The first layer (or the at least one first layer) is made of a plastic material (for example, PP or PE). The second layer is made of an oxygen barrier material; for example, the material constituting the second layer might be EVO or EVOH.

The EVOH (Ethylene vinyl alcohol) is a copolymer made of ethylene and vinyl alcohol. Moreover, EVO is a polymeric material known in the field with the term EVO®.

Ethylene vinyl alcohol copolymer (EVOH) is a material, or a group of materials, which is extremely suitable for air-tight sealing because it has outstanding gas-barrier properties.

In one embodiment, the second layer is made of EVA. EVA is a copolymer of ethylene and vinyl acetate.

In any case, the second layer is made of a material that is not permeable to oxygen. In other words, the second layer is made of a material which is capable of providing a barrier to oxygen (and odours).

In a possible embodiment, there may be a plurality of first layers made, for example, of PP or PE; in this case, the second (barrier) layer may be interposed between two of the first layers of the plurality of first layers. The object to be inspected may also include a base wall and a side wall which is inclined relative to the base wall. The first and second layers are superposed and extend over both the base wall and the side wall.

The apparatus comprises an inspection zone in which the object can be placed for inspection. In an embodiment, the apparatus comprises a conveyor. The conveyor feeds the object to the inspection zone along a feed plane. Using the conveyor, it is possible to load the inspection apparatus with a plurality of objects which are then automatically fed to the inspection zone.

In an embodiment, the apparatus comprises an imaging device. The imaging device is configured to view the object positioned in the inspection zone.

The term "inspection zone" is used to mean any region in space in which the object is placed so it can be inspected. Thus, the inspection zone is defined by the region in space which the imaging device is capable of capturing: that is to say, the field of vision of the imaging device.

The imaging device is configured to capture infrared rays. In an embodiment, the wavelength of the infrared rays captured by the imaging device is between 2 μm and 5 μm.

This allows limiting the emissions captured to those on a specific band whose wavelength is included (partially included) in the interval of wavelengths at which EVOH (or EVO) emit (or have an absorption peak). The imaging device is configured to generate an image of the object as a function of the infrared rays. In an embodiment, the imaging device is configured to generate an image of the object using a plurality of colours. In an embodiment, the imaging device is configured to generate an image of the object using scales of grey. In an embodiment, the imaging device is configured to generate an image of the object using white to identify a first state of the second layer and black to identify a second state of the second layer.

With a known colour legend, generating the image allows identifying defective portions of the object both visually and by digital processing.

The apparatus comprises a processor. The processor is connected to the imaging device.

In an embodiment, the processor is configured to receive the image generated. The processor is configured to process the image. The processor is configured to inspect the second layer.

Through the processor it is therefore possible to generate a diagnostic table containing a final diagnosis for each object inspected. The table might be used by a user to manually select the objects which conform with quality standards or by an automatic rejection system which rejects the items it identifies as non-conforming with quality standards.

In an embodiment, the conveyor is configured to dispose the inspectable objects in the inspection zone at a predetermined inspection position as a function of which the imaging device is calibrated. This feature ensures repeatability of the inspection and thus contributes to increasing the reliability of the inspection.

In an embodiment, the conveyor is configured to dispose the object in the inspection zone with the base wall positioned according to a predetermined orientation relative to the feed plane.

For the purposes of this disclosure, we define an inspection axis. The inspection axis is the axis through the camera's focus and is perpendicular to the camera lens. The inspection axis is the axis of symmetry of the field of vision; that is to say, it is equidistant from the limits of the field of vision of the imaging device.

In an embodiment, the imaging device is oriented along an inspection axis.

In an embodiment, the inspection axis is the axis of symmetry of a field of vision of the imaging device. In an embodiment, the imaging device is aligned with the inspection zone (with the object to be inspected) along the inspection axis.

In an embodiment, the apparatus comprises a deflecting system. The deflecting system is configured to intercept (divert) infrared rays that do not fall within the camera's field of vision and/or which are inclined relative to the inspection axis. In an embodiment, the infrared rays are emitted by the side wall of the object.

In an embodiment, the deflecting system is configured to divert the infrared rays in such a way as to reduce their inclination relative to the inspection axis.

The deflecting system diverts the infrared rays and directs them into the field of vision of the imaging device, thus allowing them to be captured by the imaging device.

This feature allows capturing a more extended image of the emitting surface of the side wall. This increases image resolution and thus improves inspection precision.

In an embodiment, the deflecting system includes a first deflector. In an embodiment, the deflecting system includes a second deflector. In an embodiment, the first deflector is configured to intercept the infrared rays emitted by the side wall of the object. In an embodiment, the first deflector is configured to deflect the infrared rays onto the second deflector. In an embodiment, the second deflector is configured to divert the direction of the infrared rays.

The presence of the first and second deflectors increases the flexibility of the deflecting system by increasing the number of adjustable parameters of the deflecting system.

In an embodiment, the first and/or the second deflector are axisymmetric bodies. The first and/or the second deflector have an axis of symmetry that is aligned with the inspection axis. In an embodiment, the first deflector surrounds the second deflector (in a plane perpendicular to the inspection axis).

In an embodiment, the first deflector includes a respective reflective surface. In an embodiment, the reflective surface of the first deflector surrounds the inspection axis. In an embodiment, the reflective surface of the first deflector converges on the inspection axis in a direction of emission oriented from the inspection zone to the imaging device. In an embodiment, the second deflector includes a reflective surface. The reflective surface of the second deflector surrounds the inspection axis. The reflective surface of the second deflector converges on the inspection axis in a direction of emission.

In an embodiment, the reflective surface of the first deflector is a smooth surface. In an embodiment, the reflective surface of the second deflector is a smooth surface.

That way, the image captured by the imaging device does not have any singular points.

In an embodiment, the reflective surface of the first deflector is a flat surface. In an embodiment, the reflective surface of the second deflector is a flat surface.

In an embodiment, the reflective surface of the first deflector is a concave, spherical surface. In an embodiment, the reflective surface of the second deflector is a convex, spherical surface.

In an embodiment, the reflective surface of the first deflector is a portioned surface, having a plurality of portions disposed along the reflective surface.

In an embodiment, the reflective surface of the second deflector is an irregular surface, having a plurality of portions disposed along the reflective surface.

In an embodiment, the first deflector includes a plurality of flat surfaces disposed along the reflective surface of the first deflector. In an embodiment, the second deflector includes a plurality of flat surfaces disposed along the reflective surface of the second deflector. That way the imaged surface has singular points but the image is not distorted.

In an embodiment, the apparatus comprises a light source. The light source is configured to irradiate the object in the inspection zone with a light beam. In an embodiment, the light beam has a wavelength of between 2 µm and 5 µm.

In an embodiment, the emitting source (light source) is a LED light source.

In an embodiment, the emitting source (light source) is an electrical resistor.

In an embodiment, the apparatus comprises an interference filter. The interference filter is configured to filter infrared rays. The interference filter is configured to filter the infrared rays emitted by the object. In an embodiment, the interference filter is configured to filter the infrared rays emitted by an external source.

The interference filter is configured to filter light waves directed at the camera to block light waves whose wavelength is less than 2 µm or greater than 5 µm.

The interference filter is configured to filter light waves directed at the camera to block light waves whose wavelength is less than 2.5 µm or greater than 3.5 µm. The interference filter is configured to filter light waves directed at the camera to block light waves not included in an optimum wavelength interval, corresponding to a wavelength value around which the material the barrier layer is made of has its absorption peak. The fact that the filter is configured to allow the passage of light waves whose wavelength corresponds to the peak of absorption allows reducing the measurement noise due to the fact that the camera has an imaging range that is much wider (for example, between 2.5 µm and 5 µm) in which the light rays not absorbed by the barrier layer might reduce the precision of the measurement.

In an embodiment, the interference filter has an attenuation coefficient, defined as the ratio between the intensity of the light wave upstream and downstream of the filter.

In an embodiment, the interference filter is centred on a wavelength value of 2.9 µm or 3 µm and has a filtering amplitude of 0.25 µm. In this embodiment, therefore, the interference filter allows the passage of light waves whose wavelength is between 2.65 µm and 3.15 µm or between 2.75 µm and 3.25 µm.

That way, the imaging device captures the infrared rays whose wavelength is between 2 μm and 5 μm and the measurement is not influenced by any noise whose wavelengths are not significant for inspection. The measurement precision thus increases.

In an embodiment, the apparatus comprises a fixed lens. The fixed lens determines the field of vision of the imaging device. The fixed lens is connected to the imaging device. The fixed lens is configured to operate on wavelengths of between 2 μm and 5 μm.

In an embodiment, the apparatus comprises a thermal conditioning system. The thermal conditioning system comprises a thermometer. The thermometer is configured to measure the temperature of the inspection zone and/or of the object.

The thermal conditioning system comprises a controller. The controller is configured to compare the temperature of the inspection zone with a reference temperature. The controller is configured to generate drive signals as a function of the comparison. In an embodiment, the thermal conditioning system comprises a heater. The heater is configured to vary the temperature of the inspection zone. The heater is configured to vary the temperature of the inspection zone as a function of the drive signals.

The thermal conditioning system allows increasing inspection precision. In effect, the intensity of emission or absorption of a material varies with temperature. For inspection repeatability, therefore, the ambient temperature must be kept substantially constant.

In an embodiment, the apparatus comprises an insulation system, configured to protect the inspection zone and to increase the thermal insulation of the inspection zone.

In an embodiment, the conveyor is configured to keep the object in the inspection zone with the base wall positioned parallel to the feed plane.

In an embodiment, the conveyor is configured to dispose the object in the inspection zone with the side wall facing a predetermined direction relative to the imaging device. In other words, the conveyor is configured to dispose the object in the inspection zone in such a way that it faces towards the imaging device.

In an embodiment, the apparatus comprises an orienting device, configured to orient the object according to a predetermined inspection orientation. The orienting device is configured to dispose the object in the inspection zone with the side wall facing a predetermined direction relative to the imaging device. In other words, the orienting device is configured to dispose the object in the inspection zone in such a way that it faces towards the imaging device.

In an embodiment, the imaging device is located at a position opposite to the light source with respect to the inspection axis.

According to an aspect of it, this disclosure provides a method for inspecting an object. In an embodiment, the object inspected is made up of a first layer of plastic material and a second layer of EVO or EVOH. In an embodiment, the object inspected has a base wall and a side wall which is inclined relative to the base wall.

The method comprises a step of feeding the object to an inspection zone along a feed plane. The method comprises a step of capturing infrared rays, preferably having a wavelength of between 2 μm and 5 μm, using an imaging device. The method comprises a step of generating an image of the object. The step of generating the image of the object is performed as a function of the infrared rays captured.

In an embodiment, the method comprises a step of processing the image, through a processor, in order to inspect the second layer of the object. In an embodiment, the method comprises a step of inspecting the second layer of the object as a function of the image processed.

In an embodiment, in the step of feeding, the object is disposed at an inspection position which is the same for each object inspected. In an embodiment, in the step of feeding, the base wall of the object is disposed in the inspection zone according to a predetermined orientation relative to the feed plane.

In an embodiment, the method comprises a step of deflecting. In the step of deflecting, infrared rays emitted by the side wall of the object are diverted so they can be captured by the imaging device. In the step of deflecting, infrared rays emitted by the side wall of the object are diverted so as to reduce their inclination relative to an inspection axis along which the imaging device is oriented.

In an embodiment, the step of deflecting comprises a first step of diverting.

In the first step of diverting, the infrared rays are diverted from a first deflector to a second deflector. In an embodiment, the step of deflecting comprises a second step of diverting. In the second step of diverting, the direction of the infrared rays is diverted by the second deflector so it falls within the field of vision of the imaging device.

In an embodiment, the method comprises a step of irradiating the object in the inspection zone by means of an emitting source. In an embodiment, the emitting source emits (irradiates the object with) a light beam that has a wavelength of between 2 μm and 5 μm.

In an embodiment, the method comprises a step of orienting the object according to a predetermined inspection orientation so the object adopts an inspection position.

In an embodiment, the method comprises a step of filtering. In the step of filtering, an interference filter is disposed between the capsule and the imaging device. The interference filter filters the infrared rays. The interference filter filters the infrared rays to allow only the infrared rays having a wavelength between 2 μm and 5 μm to pass. The interference filter filters the infrared rays to block the infrared rays whose wavelength is outside the interval 2 μm to 5 μm.

In an embodiment, the method comprises a step of thermal conditioning.

The step of thermal conditioning comprises a step of measuring the temperature of the inspection zone using a thermometer.

The step of thermal conditioning comprises a step of comparing the temperature of the inspection zone with a reference temperature.

The step of thermal conditioning comprises a step of generating drive signals as a function of the result of the step of comparing.

The step of thermal conditioning comprises a step of varying the temperature of the inspection zone, using a heater, as a function of the drive signals.

In an embodiment, the method comprises a step of insulating. In the step of insulating, an insulation system protects the inspection zone. In the step of insulating, an insulation system increases its thermal insulation.

BRIEF DESCRIPTION OF DRAWINGS

These and other features will become more apparent from the following detailed description of a preferred embodiment, illustrated by way of non-limiting example in the accompanying drawings, in which:

FIG. 5 shows a schematic top view of a detail of the apparatus of FIG. 1;

FIG. 6 schematically illustrates a first and a second embodiment of a deflecting device of the apparatus of FIG. 1;

DETAILED DESCRIPTION OF PREFERRED EMBODIMENTS OF THE INVENTION

Figure 1:
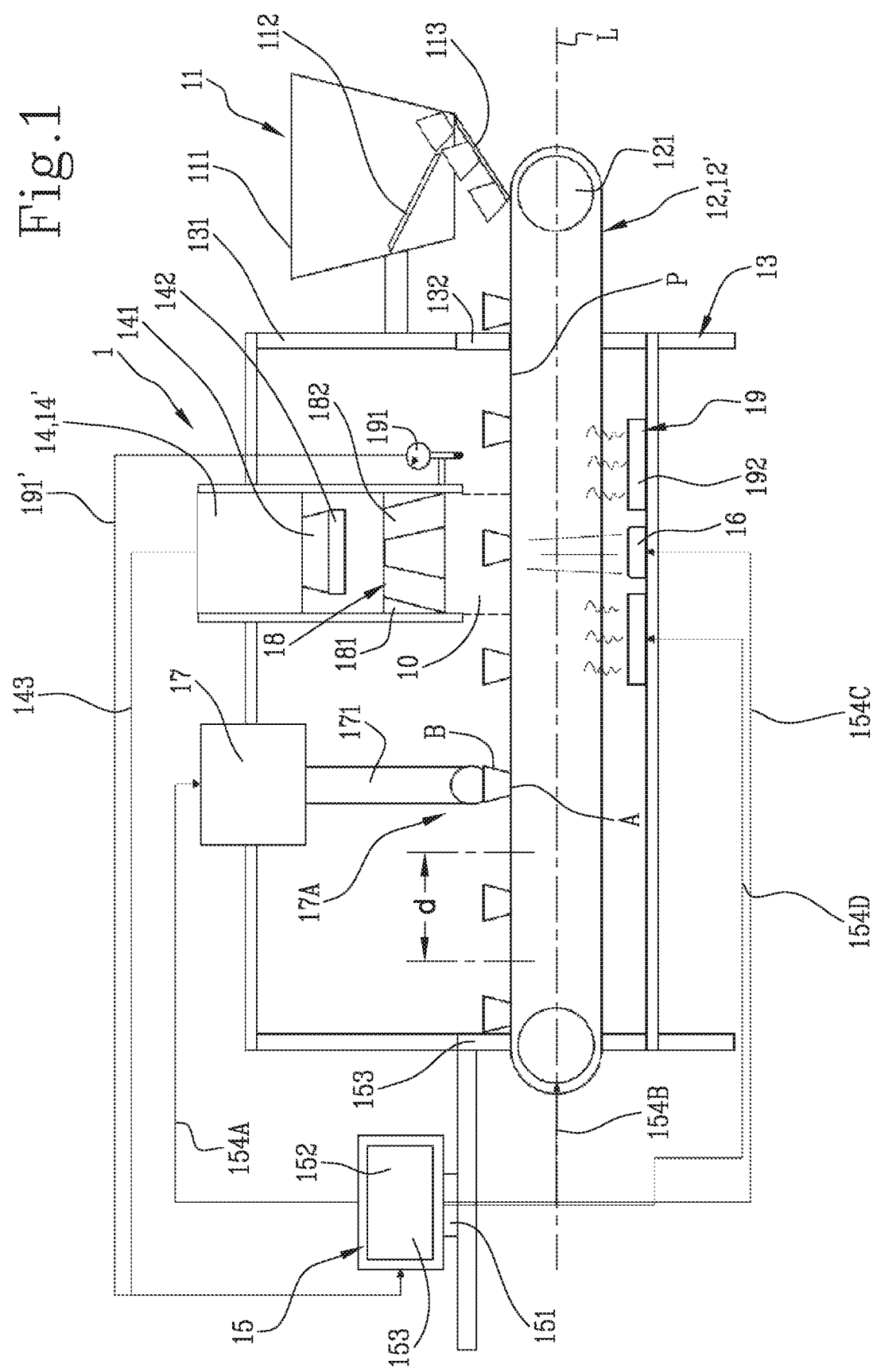
FIG. 1 schematically illustrates an apparatus for inspecting an object.
Figure 2:
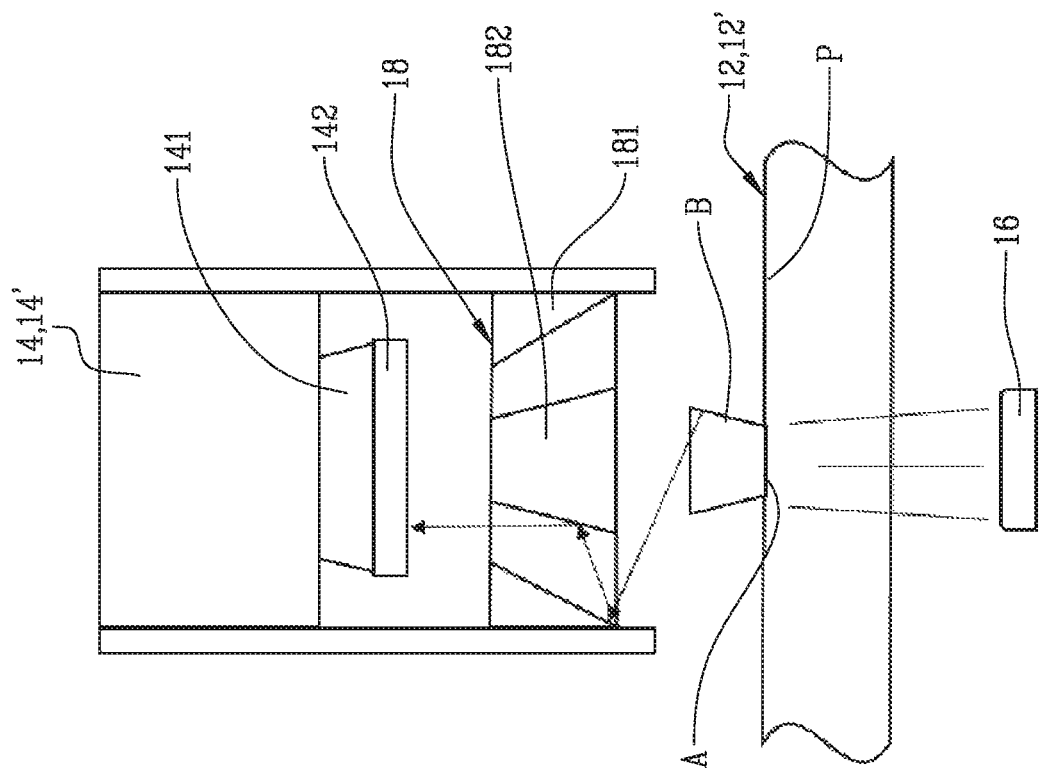
FIG. 2 schematically illustrates a detail of the apparatus of FIG. 1.
Figure 3B:
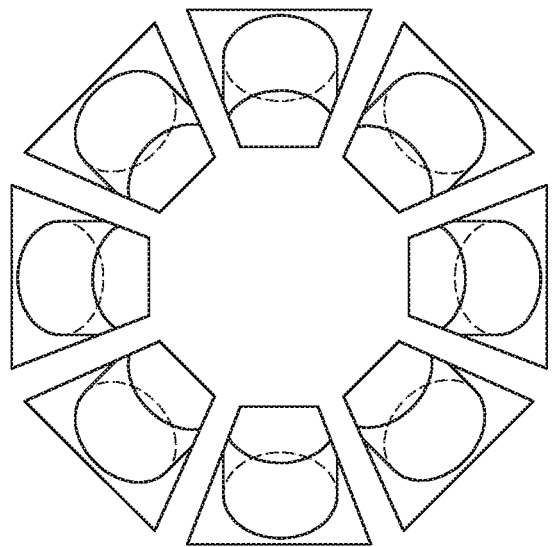
FIGS. 3A and 3B show a first and a second image of the object, generated by the imaging device.
Figure 3A:
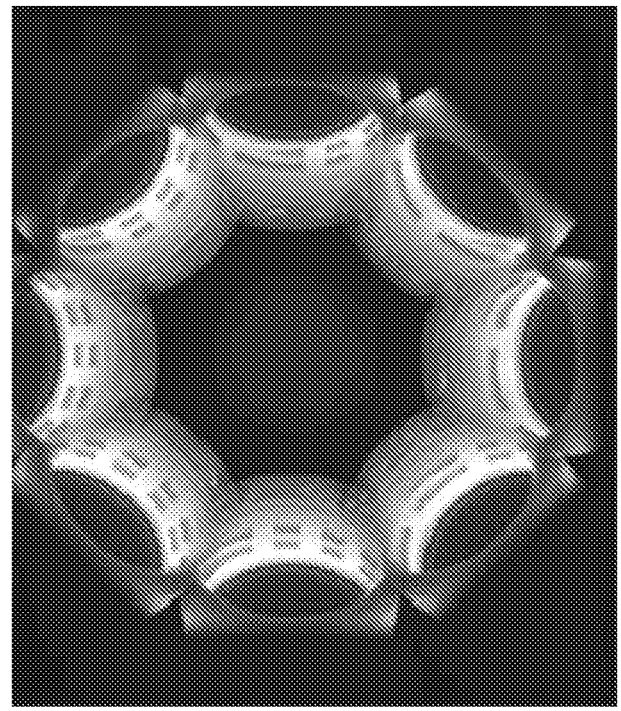
Figure 4B:
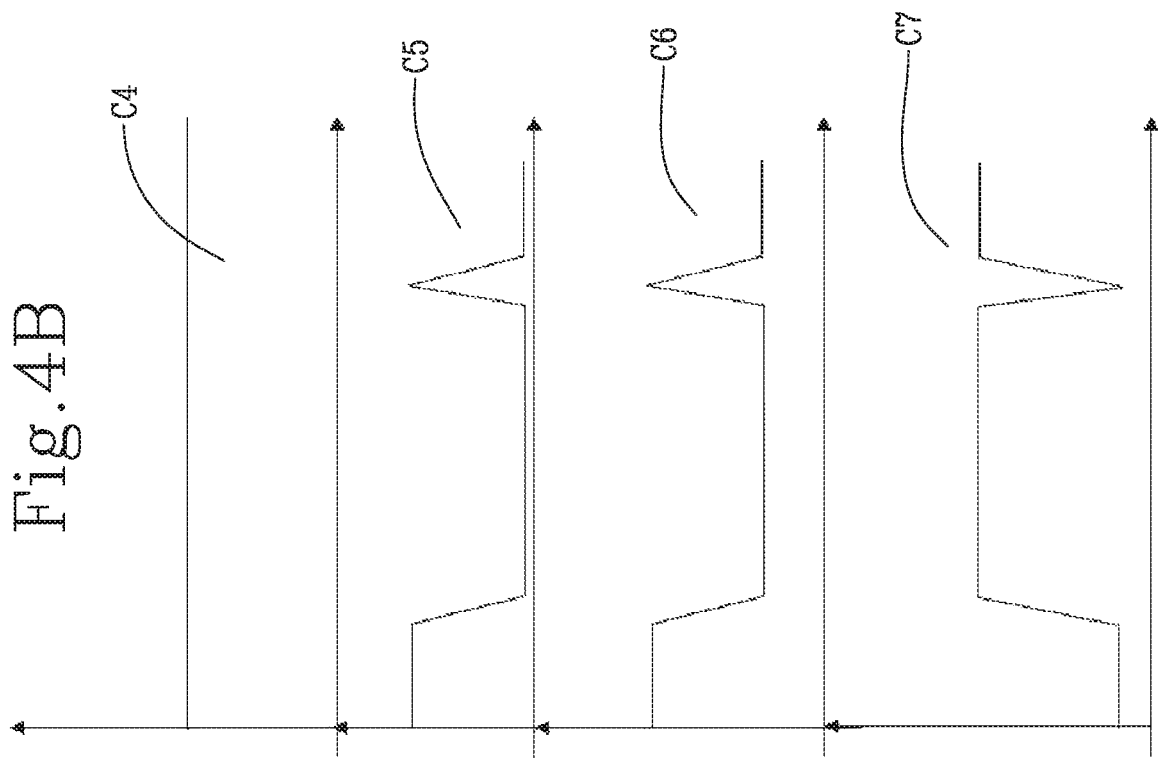
FIG. 4B schematically illustrates, for each portion of the object, the intensity of a light beam emitted by the source upstream of the object, the intensity of the light beam emitted by the source downstream of the object, the correlated light parameter for generating an image and the thickness of the EVOH layer of the material, respectively.
Figure 4A:
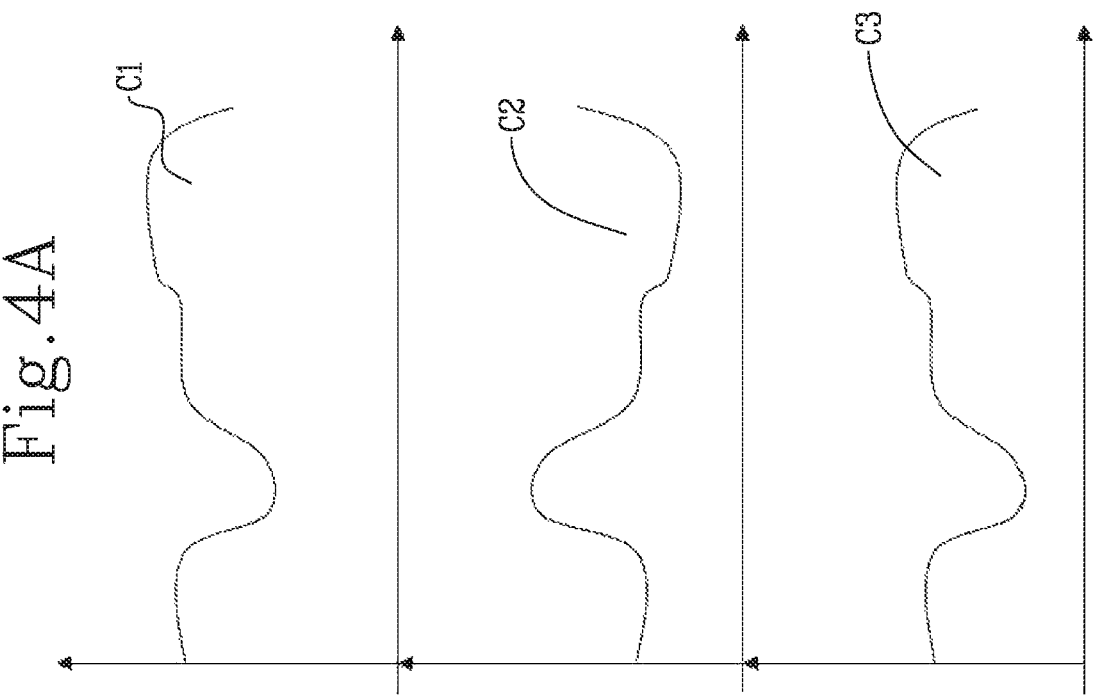
FIG. 4A schematically illustrates, for each portion of the object, the emitting intensity; the correlated light parameter for generating an image and the thickness of the EVOH layer of the material, respectively.

With reference to the accompanying drawings, the numeral 1 denotes an apparatus for inspecting an object. The apparatus 1 may be used to inspect any object, specifically objects made up of a first layer and a second layer, where the second layer is made of EVO and/or EVOH. The apparatus 1 may be used to inspect any object, specifically objects having a base wall A and a side wall B. In an embodiment, the object to be inspected comprises a circular crown C, parallel to the base wall A. The side wall B comprises a first end edge and a second end edge. The base wall A is connected to the first end edge of the side wall B. The circular crown C is connected to the second end edge of the side wall B and extends to the outside of the second end edge of the side wall B.

In an embodiment, the apparatus 1 comprises an inspection zone 10. The inspection zone 10 is a zone in which the object can be placed for inspection.

In an embodiment, the apparatus 1 comprises a feeder 11. In an embodiment, the apparatus 1 comprises a conveyor 12, configured to transport the object from the feed zone to the inspection zone. The feeder 11 is configured to receive a plurality of objects to be inspected. The feeder 11 is configured to feed the plurality of objects. In an embodiment, the feeder 11 comprises a container 111. The container 111 is configured to contain the plurality of objects waiting to be fed. In an embodiment, the feeder 11 comprises an orienting device 112. The orienting device 112 is configured to orient the objects according to a predetermined orientation in such a way that they reach the inspection zone in a predetermined inspection position. The orienting device 112 is, for example, a singulator.

In an embodiment, the container 111 comprises a feed ramp 113. The feed ramp 113 is configured to receive the objects from the orienting device 112 and to feed them to the conveyor 12. In an embodiment, the feed ramp 113 is configured to release the objects onto the conveyor 12 at a predetermined temporal rate. That way, the objects transported by the conveyor 12 are spaced from each other by an inspection distance d.

In an embodiment, the feeder is a linear conveyor which transfers the objects onto the conveyor 12. In other embodiments, the feeder is a robot, configured to pick up the objects one by one. The robot is configured to place an objects on the conveyor 12 at a predetermined rate, which defines the inspection distance d.

In an embodiment, the conveyor 12 is a conveyor belt 12', configured to transport the object from the feed zone to the inspection zone. In other embodiments, the conveyor might be a rotary carousel, configured to transport the object from the feed zone to the inspection zone.

In an embodiment, the conveyor belt 12' extends along a longitudinal direction L.

The conveyor belt 12' includes a conveyor actuator 121. The conveyor actuator 121 is configured to drive the conveyor belt 12' in order to transport the objects.

In an embodiment, the conveyor belt 12' comprises a first portion 12A and a second portion 12B. The first portion 12A and the second portion 12B extend in parallel along the longitudinal direction L. The first portion 12A and the second portion 12B are spaced from each other by a value included between the diameter of the circle of the second end edge and the outside diameter of the circular crown C. That way, the conveyor belt 12' is configured to transport the objects in a suspended condition, with one portion of the circular crown C resting on the first portion 12A of the conveyor belt 12' and another portion of the circular crown C resting on the second portion 12B of the conveyor belt 12'. This conveying configuration means, for example, that there is no material interposed between an emitting source, if any (or imaging device) and the base wall A and/or the side wall B.

In other embodiments, the objects rest on the conveyor belt 12'.

In an embodiment, the objects rest on the conveyor belt 12' with the base wall A in contact with the conveyor belt 12'. In an embodiment, the objects rest on the conveyor belt 12' with the circular crown C in contact with the conveyor belt 12'.

The apparatus 1 comprises a frame 13. The frame 13 has the function of supporting the machine and insulating the inspection zone 10.

In an embodiment, the frame 13 comprises one or more insulating walls 131. The one or more insulating walls 131 are configured to allow the inspection zone 10 to be thermally insulated. The one or more walls may include an inlet opening 132 and an outlet opening 133.

The conveyor 12 extends from the inlet opening 132 to the outlet opening 133. The one or more insulating walls 131 are configured to allow the objects to be protected during inspection so that inspection is not distorted by external factors.

The apparatus 1 comprises an imaging device 14'. In an embodiment, the imaging device 14' is a camera 14. In an embodiment, the camera 14 is configured to view the object in the inspection zone 10. In an embodiment, the camera 14 is an infrared camera. In an embodiment, the camera 14 is configured to capture electromagnetic waves having a wavelength of between 2 μm and 5 μm.

The camera 14 has a specific field of vision of its own. In other words, the camera defines an input band in the sense that it is configured to capture light in a predetermined wavelength interval. In an example embodiment, the camera is configured to capture light in a predetermined wavelength interval of 2.5 μm to 5 μm. The camera 14 also defines a narrower input band (for example 2 μm or 1 μm or even less), preferably centred or substantially centred on the wavelength of 3.1 μm.

The camera 14 comprises a fixed lens 141. In an embodiment, the fixed lens 141 is a lens configured to work in the infrared emitting band, preferably with wavelengths of between 2 μm and 5 μm. In an embodiment, the fixed lens 141 has a focal length of 35 mm. In an embodiment, the focal length of the fixed lens 141 is between 30 mm and 40 mm.

In an embodiment, the apparatus 1 comprises a filter. In an embodiment, the apparatus 1 comprises an interference filter 142. The interference filter 142 is operatively interposed between the camera and the object to be inspected. The interference filter 142 is configured to filter the input rays of the camera 14 to limit the input rays entering the camera to a predetermined wavelength interval. More specifically, the interference filter 142 is a bandpass filter (bandpass emission or, in dual mode, band-stop absorption). Preferably, the pass band of the interference filter 142 is narrower than the input pass band of the camera. In an embodiment, the interference filter defines a (pass) band which, considering a transmission of 10%, is less (or not greater) than 1 μm; preferably, the (pass) band is less (or not greater) than 0.3 μm (for example, it is approximately 0.25 μm); considering a transmission of 50%, the band of the interference filter is preferably not greater than 0.2 μm or, still more preferably, not greater than 0.1 μm.

In an embodiment, the band of the interference filter is centred on a wavelength of between 2.9 μm and 3.2 μm; preferably, it is centred on a wavelength of 3.1 μm.

That way, the image captured by the camera is particularly reliable in terms of diagnostics; in effect, the rays captured by the camera 14 are even cleaner because the noise due to emissions whose wavelength is far from the EVOH absorption peak is filtered by the interference filter 142.

Figure 7:
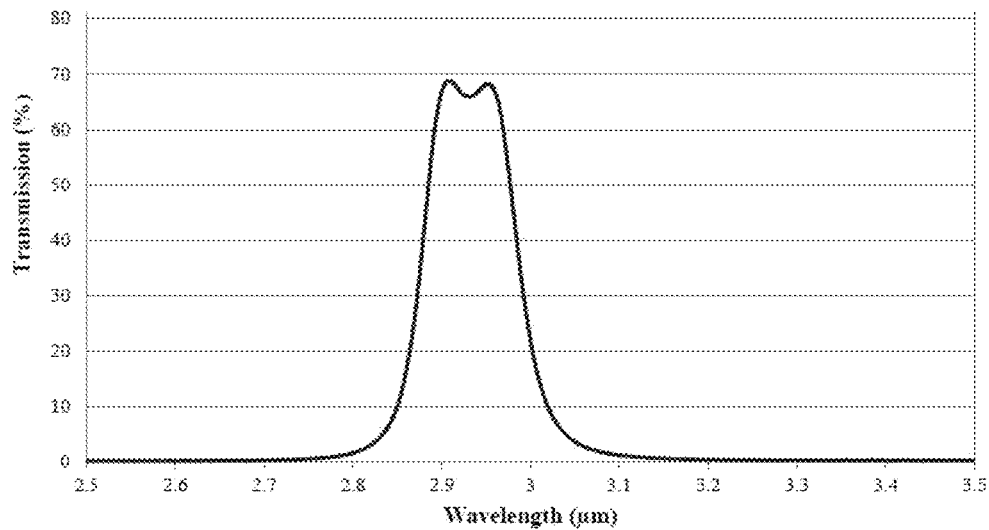
FIG. 7 illustrates a curve of the transmission value (part of the light wave transmitted relative to that incident thereon) of the interference filter as a function of the wavelength of the light wave which strikes the interference filter itself.

FIG. 7 shows a curve of the transmission value (part of the light wave transmitted relative to that incident thereon) of the interference filter 142 as a function of the wavelength of the light wave which strikes the interference filter 142 itself.

It should be noted that in the example illustrated (purely by way of a non-limiting example), the interference filter 142 has a pass band (transmission band) (wavelength interval within which the interference filter transmits the light waves that strike it) of approximately 0.25 μm (considering a transmission of about 10%) centred on a wavelength value of 2.95 μm (or in any case between 2.95 μm and 3.00 μm).

Figure 8:
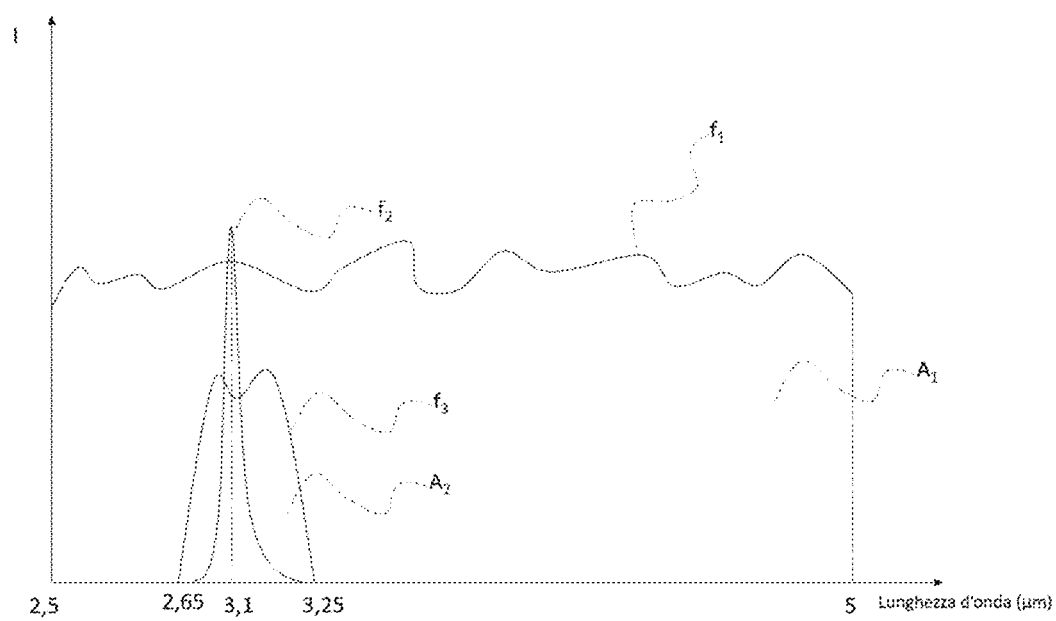
FIG. 8 shows the curves of three functions f1, f2, f3.

FIG. 8 shows the curves of three functions $f_1$, $f_2$, $f_3$.

Function $f_1$ shows a curve of the intensity of a light wave ray emitted by a source that is configured to emit a light wave in a wavelength interval of between 2.5 μm and 5 μm. In an embodiment, the camera 14 is, in effect, configured to capture light waves emitted in that wavelength interval.

The camera thus captures a quantity of energy equal to the integral of the curve $f_1$ in the interval of between 2.5 μm and 5 μm (area $A_1$ in FIG. 8). Function $f_2$ shows an energy absorption curve of the barrier layer as a function of the wavelength of the light that strikes it. In the specific case where the barrier layer is EVOH, EVO, the absorption peak occurs around 3.1 μm.

Function $f_3$ shows a curve of the intensity of the light wave ray emitted by a source that is captured by the camera 14 in the embodiment where the interference filter 142 is interposed between the camera 14 and the source, according to one possible example embodiment. As may be inferred from function $f_3$, the interference filter 142 allows passing only the light rays whose wavelengths fall within an interval around the wavelength corresponding to the peak absorption of the EVOH, EVO.

The camera thus captures a quantity of energy equal to the integral of the curve $f_3$ in the interval of between 2.5 μm and 5 μm (area $A_2$ in FIG. 8). Using the interference filter, the quantity of energy captured by the camera has a percentage variation of absorbed energy relative to the total quantity of energy captured by the camera which is particularly sensitive to the presence (or the thickness or quality) of the barrier layer. If no interference filter 142 were used, on the other hand, the quantity of energy captured by the camera would have a limited percentage variation that would be undetectable during quality control.

According to another aspect, the emitting source 16 might be configured to emit light in a limited wavelength interval, which might even be narrower than the input band of the camera. For example, the emitting source 16 might be configured to emit light in an interval of wavelengths not greater than 3 μm or 2 μm or 1 μm or even less; preferably, the wavelength interval is centred or substantially centred on the 3.1 μm wavelength. In an embodiment, the object has an inspection temperature at which it is imaged by the camera 14. The temperature of the object causes the object to emit waves whose wavelength is included in the infrared range. More specifically, each material has a characteristic emission band, in which the material emits radiation at a temperature which is different from ambient temperature. EVOH has an absorption peak (hence an emission peak) at wavelengths of around 3.1 μm.

It should be noted that the camera is, generally speaking, configured to capture any infrared radiation, whether emitted by the object or by an external body. In an embodiment, the camera 14 is configured to capture the infrared radiation emitted by the object.

The camera 14 is configured to generate an image 143 of the object as a function of the radiation captured.

In an embodiment, the camera 14 is configured to capture a value of radiation intensity for each zone of the object. The zone of each object is identified by a point in a Cartesian plane which may identify the centre of gravity of the corresponding zone.

In an embodiment, the camera 14 is configured to associate each zone with a corresponding image luminosity value as a function of the radiation intensity value of the corresponding zone.

The camera 14 is configured to generate an image 143 of the object as a function of the image luminosity value associated with each zone.

In an embodiment, the camera 14 is configured to associate each zone with a luminosity value chosen between a first luminosity value and a second luminosity value. More specifically, in an embodiment, the camera 14 is configured to compare the radiation intensity with an intensity limit value. The camera 14 is configured to associate the first luminosity value with the zones whose radiation intensity is less than the intensity limit value and to associate the second luminosity value with the zones whose radiation intensity is greater than the intensity limit value.

In an embodiment, the apparatus 1 comprises an emitting source 16. The light source is configured to irradiate the object in the inspection zone with infrared radiation. In an embodiment, the emitting source is configured to irradiate the object in the inspection zone with infrared radiation having a wavelength of between 2 μm and 5 μm.

In an embodiment, the emitting source is a LED light configured to emit radiation in the infrared range.

In an embodiment, the emitting source is an electrical resistor configured to emit radiation in the infrared range.

In this embodiment, the camera 14 is configured to capture the intensity of the radiation emitted by the source. In this embodiment, therefore, the presence of the EVOH is inspected using the absorbing capabilities of the material and not its emitting capabilities. In effect, the peak absorption of EVOH and/or EVO occurs on radiation whose wavelength is between 2 μm and 5 μm. Thus, when the emitting source strikes it, the object absorbs a part of the energy emitted on account of the presence and thickness of the EVOH/EVO layer.

Thus, compared to the embodiment in which the camera captures the emissions of the material, this embodiment captures the energy absorbed by the material. In this case, therefore, the camera 14 is configured to associate each zone of the object with a luminosity value that is directly proportional to the intensity value captured for the corresponding zone. In effect, a high emitting intensity identifies poor absorption and hence, the absence or thinness of the second layer (barrier layer) of EVOH/EVO. Instead, in the embodiment in which the camera captures the emissions of the material itself, the camera 14 is configured to associate each zone of the object with a luminosity value that is inversely proportional to the intensity value captured for the corresponding zone. In effect, a high emitting intensity identifies the presence and substantial thickness of the second layer (barrier layer) of EVOH/EVO.

In an embodiment, the apparatus 1 comprises a control unit 15. The control unit 15 comprises a processor 151. The control unit 15 comprises a display 152. The control unit 15 comprises a user interface 153, configured to allow the user to enter data of control the apparatus 1 manually.

In an embodiment, the processor 151 is configured to receive the image 143 of the object from the camera 14. The processor 151 is configured to process the image 143. The processor 151 is configured to generate a report of the object which the image 143 refers to. The processor is configured to generate a rejection signal 154A as a function of the report. In an embodiment, the control unit 15 is configured to control the apparatus 1.

In an embodiment, the apparatus 1 comprises a discharging device 17. The discharging device 17 is configured to automatically reject an object found to be non-conforming with quality standards. The apparatus comprises a discharging zone 17A, located downstream of the inspection zone 10 along the conveyor belt 12'.

The discharging device 17 is configured to apply a force on the objects in the discharging zone 17A. For example, but not necessarily, the discharging device 17 includes a blower 171, configured to direct a flow of air at the object in such a way as to remove it from the conveyor belt 12'. The discharging device 17 is configured to receive from the control unit 15 the rejection signal 154A as a function of which the discharging device 17 is enabled or disabled.

In an embodiment, the rejection signal 154A is a continuous signal which may adopt an enabling value or a disabling value. The rejection signal 154A is synchronized with the conveyor belt 12' so that the enabling value or the disabling value associated with an object is captured the instant the object itself reaches the discharging zone 17A.

In an embodiment, the control unit 15 is configured to send to the conveying actuator 121 an actuation signal 154B as a function of which the conveying actuator 121 starts or stops the movement of the conveyor belt 12'.

In an embodiment, the control unit 15 is configured to control the emitting source 16. The control unit 15 is configured to generate emitting signals 154C, representing the intensity of the radiation emitted by the emitting source 16. The emitting source 16 is configured to receive the emitting signals 154C and to emit the infrared rays as a function of the emitting signals 154C.

In an embodiment, the emitting source 16 is opposite to the camera 14 relative to the inspection zone 10. Thus, the emitting source 16, the camera 14 and the inspection zone are aligned along the inspection axis I.

In an embodiment, the emitting source 16 is located under the conveyor belt 12'. In an embodiment, the emitting source 16 is located inside the conveyor belt 12'.

In an embodiment, the apparatus 1 comprises a deflecting system 18. The deflecting system 18 is configured to divert infrared rays. The deflecting system 18 is configured to divert infrared rays which are inclined relative to the inspection axis I. The deflecting system 18 is configured to divert infrared rays emitted by the object. The deflecting system 18 is configured to divert infrared rays emitted by the emitting source 16 and partly absorbed by the absorbent properties of the second layer of the object.

The deflecting system 18 is configured to divert infrared rays emitted by the side wall B of the object.

In an embodiment, the deflecting system 18 is located along the inspection axis I, between the camera 14 and the inspection zone 10.

In an embodiment, the deflecting system comprises a plurality of reflective elements, configured to reflect the infrared rays.

In an embodiment, the deflecting system comprises a first deflector 181. In an embodiment, the deflecting system comprises a second deflector 182. The first deflector 181 includes a toroidal body 181'. The toroidal body 181' has an inner side wall 181". The inner side wall 181" of the first deflector 181 is a reflective wall. In an embodiment, the inner side wall 181" comprises a smooth curved reflective surface 1811. In an embodiment, the inner side wall 181" comprises a first plurality of flat mirrors 1812. Each mirror of the first plurality of flat mirrors 1812 is located on the inner side wall 181". The reflective surface of the inner side wall 181" is defined by the sum of the reflective surfaces of the mirrors of the first plurality of flat mirrors 1812.

The second deflector 182 includes a tapered (frustoconical) body 182'. The tapered body 182' has an outer side wall 182". The outer side wall 182" of the second deflector 182 is a reflective wall. In an embodiment, the outer side wall 182" comprises a smooth curved reflective surface 1821. In an embodiment, the outer side wall 182" comprises a second plurality of flat mirrors 1822. Each mirror of the second plurality of flat mirrors 1822 is located on the outer side wall 182". The reflective surface of the outer side wall 182" is defined by the sum of the reflective surfaces of the mirrors of the second plurality of flat mirrors 1822.

In an embodiment in which the first and the second deflectors comprise respective smooth curved reflective surfaces, the image 143 generated by the camera 14 will be smooth with a certain distortion coefficient of the image 143. The processor 151 is configured to allow for the distortion coefficient during processing of the image 143. In an embodiment in which the first and the second deflectors comprise the respective pluralities of flat mirrors, the image 143 generated by the camera 14 comprises singular points but no distortion of the image 143.

The first deflector 181 is configured to receive (intercept) the infrared rays emitted by the object or by the emitting source 16. The first deflector 181 is configured to deflect the infrared rays onto the second deflector 182. The second deflector 182 is configured to deflect the infrared rays into the field of vision of the camera 14.

In an embodiment, the apparatus 1 comprises a thermal conditioning system 19. The thermal conditioning system 19 is configured to keep the temperature of the inspection zone 10 at a predetermined value. The thermal conditioning system 19 is configured to keep the temperature of the object at a predetermined value. The thermal conditioning system 19 is configured to heat and/or cool the inspection zone 10 and/or the object.

The thermal conditioning system 19 comprises a thermometer 191. The thermometer 191 is configured to measure the temperature of the inspection zone 10 and/or of the object being inspected. The thermometer 191 is configured to send to the control unit 15 (to the processor 151) temperature signals 191' representing the temperature of the inspection zone 10 and/or of the object.

The processor 151 (the control unit 15) is configured to receive the temperature signal and to compare it with a predetermined reference temperature signal representing the predetermined temperature.

The processor 151 (the control unit 15) is configured to generate thermal conditioning signals 154D as a function of the result of the comparison between the temperature signal and the reference temperature signal.

In an embodiment, the thermal conditioning system 19 comprises a heater 192. The heater 192 is configured to heat the inspection zone 10 and/or the object to bring it back to the predetermined temperature. The processor 151 is configured to send the thermal conditioning signals 154D to the heater 192. The heater 192 is configured to switch on or off as a function of the thermal conditioning signals 154D. In an embodiment, the heater 192 is located under the inspection zone 10 (of the conveyor belt 12') to facilitate convective heat exchange.

According to an aspect of it, this disclosure also provides a method for inspecting an object. The object to be inspected is preferably made up of a first layer and a second layer, where the second layer is made of EVO and/or EVOH. The object to be inspected preferably has a base wall A and a side wall B. In an embodiment, the object to be inspected comprises a circular crown C, parallel to the base wall A. The side wall B comprises a first end edge and a second end edge. The base wall A is connected to the first end edge of the side wall B. The circular crown C is connected to the second end edge of the side wall B and extends to the outside of the second end edge of the side wall B.

In an embodiment, the method comprises a step of preparing an inspection zone 10 in which the object can be placed for inspection.

In an embodiment, the method comprises a step of preparing a feeder 11.

In an embodiment, the method comprises a step of preparing a conveyor 12. The method comprises a step of transporting in which the conveyor 12 transports the object from the feed zone to the inspection zone. The method comprises a step of feeding In the step of feeding, the feeder 11 receives a plurality of objects to be inspected. In the step of feeding, the feeder 11 feeds the plurality of objects. In the step of feeding, a container 111 of the feeder 11 contains the plurality of objects waiting to be fed. In the step of feeding, an orienting device 112 of the feeder 11 orients the objects according to a predetermined orientation in such a way that they reach the inspection zone in a predetermined inspection position. In the step of feeding, a feed ramp 113 of the container 111 receives the objects from the orienting device 112 and feeds them to the conveyor 12. In the step of feeding, the feed ramp 113 releases the objects onto the conveyor 12 at a predetermined temporal rate. That way, the objects transported by the conveyor 12 are spaced from each other by an inspection distance d.

In an embodiment, the method comprises a step of actuating, in which a conveying actuator 121 drives a conveyor belt 12', thereby allowing the objects to be transported.

In an embodiment, the conveyor belt 12' comprises a first portion 12A and a second portion 12B. The first portion 12A and the second portion 12B extend in parallel along the longitudinal direction L and the conveyor belt 12' transports the objects in a suspended condition, with one portion of the circular crown C resting on the first portion 12A of the conveyor belt 12' and another portion of the circular crown C resting on the second portion 12B of the conveyor belt 12'. This conveying configuration means, for example, that there is no material interposed between an emitting source, if any (or imaging device) and the base wall A and/or the side wall B.

During the step of transporting, in other embodiments, the objects rest on the conveyor belt 12'.

In an embodiment, during the step of transporting, the objects rest on the conveyor belt 12' with the base wall A in contact with the conveyor belt 12'.

In an embodiment, during the step of transporting, the objects rest on the conveyor belt 12' with the circular crown C in contact with the conveyor belt 12'.

The method comprises a step of supporting, in which the frame 13 supports the machine.

In an embodiment, the method comprises a step of insulating, in which one or more insulating walls 131 of the frame 13 thermally insulate the inspection zone 10.

In the step of insulating, the one or more insulating walls 131 protect the objects during inspection so that inspection is not distorted by external factors.

In an embodiment, the method comprises a step of capturing images. In the step of capturing images, an imaging device 14', for example a camera 14, views the object in the inspection zone 10. In the step of capturing images, the camera 14 captures electromagnetic waves having a wavelength of between 2 μm and 5 μm.

In the step of capturing, a fixed lens 141 of the camera 14 works in the infrared emitting band, preferably with wavelengths of between 2 μm and 5 μm.

In an embodiment, the step of capturing comprises a step of filtering. In the step of filtering, an interference filter 142 filters the electromagnetic rays captured by the camera 14 so that only the set of rays having a specific wavelength is captured. More specifically, in an embodiment, the interference filter is centred on a band of wavelength between 2 μm and 5 μm so as to allow capturing only the waves having these wavelengths. Each material has a characteristic emission band, in which the material emits radiation at a temperature which is different from ambient temperature. EVOH has an absorption peak (hence an emission peak) at wavelengths of around 3.1 μm.

Thus, the camera 14 captures these infrared rays emitted by the object. In an embodiment, the method comprises a step of generating. In the step of generating, the camera 14 generates an image 143 of the object as a function of the radiation captured.

In the step of capturing, the camera 14 captures a value of radiation intensity for each zone of the object. The zone of each object is identified by a point in a Cartesian plane which may identify the centre of gravity of the corresponding zone.

In the step of capturing and/or generating, the camera 14 associates each zone with a corresponding image luminosity value as a function of the radiation intensity value of the corresponding zone.

In the step of capturing and/or generating, the camera 14 generates the image 143 of the object as a function of the image luminosity value associated with each zone.

In the step of capturing and/or generating, the camera 14 associates each zone with a luminosity value chosen between a first luminosity value and a second luminosity value. More specifically, in the step of generating the image, the camera 14 compares the radiation intensity with an intensity limit value. The camera 14 associates the first luminosity value with the zones whose radiation intensity is less than the intensity limit value and associates the second luminosity value with the zones whose radiation intensity is greater than the intensity limit value.

In an embodiment, the processor 151 and/or the camera 14 are configured to generate one or more of the following graphs:

graph $C_1$: representing the emitting intensity of the object as a function of a coordinate which identifies an emitting zone of the object;

graph $C_2$: representing a luminous intensity as a function of the emitting intensity of the object for each coordinate which identifies an emitting zone of the object;

graph $C_3$: representing a thickness of the second layer as a function of the emitting intensity value and/or of the luminous intensity for each coordinate which identifies an emitting zone of the object;

graph $C_4$: representing, for each zone of the object, the emitting intensity of a radiation beam before the beam strikes the object;

graph $C_5$: representing, for each zone of the object, the emitting intensity of a radiation beam after the beam has struck the object;

graph $C_6$: representing, for each zone of the object, a luminous intensity as a function of the value of absorption of the external radiation;

graph $C_7$: representing, for each zone of the object, a thickness of the second layer as a function of the luminous intensity value of the graph $C_6$.

In an embodiment, the method comprises a step of emitting. In the step of emitting, an emitting source 16 of the apparatus 1 irradiates the object in the inspection zone with infrared radiation. In an embodiment, the emitting source irradiates the object in the inspection zone with infrared radiation having a wavelength of between 2 μm and 5 μm.

In this embodiment, in the step of capturing, the camera 14 captures the intensity of the radiation emitted by the source. In this embodiment, therefore, the presence of the EVOH is inspected using the absorbing capabilities of the material and not its emitting capabilities. In effect, when the emitting source strikes it, the object absorbs a part of the energy emitted on account of the presence and thickness of the EVOH/EVO layer. Thus, compared to the embodiment in which the camera captures the emissions of the material, this embodiment captures the energy absorbed by the material. In this case, therefore, the camera 14 associates each zone of the object with a luminosity value that is directly proportional to the intensity value captured for the corresponding zone. In effect, a high emitting intensity identifies poor absorption and hence, the absence or thinness of the second layer (barrier layer) of EVOH/EVO. Instead, in the embodiment in which the camera captures the emissions of the material itself, the camera 14 associates each zone of the object with a luminosity value that is inversely proportional to the intensity value captured for the corresponding zone. In effect, a high emitting intensity identifies the presence and substantial thickness of the second layer (barrier layer) of EVOH/EVO.

The method comprises a step of preparing a control unit 15 including a processor 151, a display 152 and a user interface 153.

In an embodiment, the method comprises a step of checking.

In the step of checking, the control unit 15 checks the apparatus 1.

In the step of checking, the processor 151 receives the image 143 of the object from the camera 14. The processor 151 processes the image 143. The processor 151 generates a report of the object which the image 143 refers to. The processor generates a rejection signal 154A as a function of the report.

In an embodiment, the method comprises a step of discharging. In the step of discharging, a discharging device 17 (automatically) rejects an object found to be non-conforming with quality standards. In the step of discharging, the discharging device 17 rejects the object in a discharging zone 17A, located downstream of the inspection zone 10 along the conveyor belt 12'.

In the step of discharging, the discharging device 17 applies a force on the objects in the discharging zone 17A. For example, but not necessarily, the discharging device 17 includes a blower 171, which directs a flow of air at the object in such a way as to remove it from the conveyor belt 12'.

In the step of discharging, the discharging device 17 receives from the control unit 15 the rejection signal 154A as a function of which the discharging device 17 is enabled or disabled.

In an embodiment, the rejection signal 154A is a continuous signal which may adopt an enabling value or a disabling value. The rejection signal 154A is synchronized with the conveyor belt 12' so that the enabling value or the disabling value associated with an object is captured the instant the object itself reaches the discharging zone 17A.

In the step of checking, the control unit 15 sends to the conveying actuator 121 an actuation signal 154B as a function of which the conveying actuator 121 starts or stops the movement of the conveyor belt 12'.

In the step of checking, the control unit 15 checks the emitting source 16. The control unit 15 generates emitting signals 154C, representing the intensity of the radiation emitted by the emitting source 16. The emitting source 16 receives the emitting signals 154C and emits the infrared rays as a function of the emitting signals 154C.

In an embodiment, the method comprises a step of deflecting. In the step of deflecting, a deflecting system 18 diverts infrared rays. In the step of deflecting, a deflecting system 18 diverts infrared rays which are inclined relative to the inspection axis I along which the camera 14 is oriented. In the step of deflecting, a deflecting system 18 diverts the infrared rays emitted by the object. In the step of deflecting, a deflecting system 18 diverts the infrared rays emitted by the emitting source 16. In an embodiment, the deflecting system 18 diverts infrared rays emitted by the side wall B of the object.

In the step of deflecting, a plurality of reflective elements of the deflecting system reflect the infrared rays.

In an embodiment, the step of deflecting comprises a first step of diverting. In an embodiment, the step of deflecting comprises a second step of diverting.

In the first step of diverting, the first deflector 181 receives (intercepts) the infrared rays emitted by the object or by the emitting source 16. The first deflector 181 directs the infrared rays at the second deflector 182.

In the second step of diverting, the second deflector 182 directs the infrared rays into the field of vision of the camera 14.

In the first step of diverting, an inner side wall 181" of the first deflector 181 reflects the infrared rays. In an embodiment, the inner side wall 181" may be a smooth reflective surface 1811 and/or a first plurality of flat mirrors 1812.

In the second step of diverting, an outer side wall 182" of the second deflector 182 reflects the infrared rays. In an embodiment, the outer side wall 182" comprises a smooth reflective surface 1821 and/or a second plurality of flat mirrors 1822.

In an embodiment in which the first and the second deflectors comprise respective smooth curved reflective surfaces, the camera generates the image 143, which will be a smooth image with a certain distortion coefficient. In the step of generating, the processor 151 takes the distortion coefficient into account to process the image 143. In an embodiment in which the first and the second deflectors comprise the respective pluralities of flat mirrors, the camera generates the image 143, which will be a smooth image with singular points but no distortion of the image 143.

In an embodiment, the method comprises a step of thermal conditioning.

In the step of thermal conditioning, the thermal conditioning system 19 keeps the temperature of the inspection zone 10 at a predetermined value. The thermal conditioning system 19 keeps the temperature of the object at a predetermined value. The thermal conditioning system 19 heats and/or cools the inspection zone 10 and/or the object.

In the step of thermal conditioning, a thermometer 191 measures the temperature of the inspection zone 10 and/or of the object being inspected. The thermometer 191 sends to the control unit 15 (to the processor 151) temperature signals 191' representing the temperature of the inspection zone 10 and/or of the object.

In the step of thermal conditioning (and/or of checking), the processor 151 (the control unit 15) receives the temperature signal and compares it with a predetermined reference temperature signal representing the predetermined temperature.

In the step of thermal conditioning (and/or of checking), the processor 151 (the control unit 15) generates thermal conditioning signals 154D as a function of the result of the comparison between the temperature signal and the reference temperature signal.

In the step of thermal conditioning, a heater 192 of the thermal conditioning system 19 heats the inspection zone 10 and/or the object to bring it back to the predetermined temperature. The processor 151 sends the thermal conditioning signals 154D to the heater 192. The heater 192 switches on or off as a function of the thermal conditioning signals 154D.

The invention claimed is:

1. An apparatus for inspecting an object, where the object is made up of a first layer of plastic material and a second layer of EVO or EVOH and has a base wall and a side wall which is inclined relative to the base wall, the apparatus comprising:
   an inspection zone in which the object can be placed for inspection;
   a conveyor for feeding the object to the inspection zone along a feed plane;
   an imaging device configured to view the object positioned in the inspection zone, to capture infrared rays having a wavelength of between 2 μm and 5 μm and to generate an image of the object as a function of the infrared rays;
   a processor, connected to the imaging device to receive the images generated and configured to process the images, to inspect the second layer,
   wherein the conveyor is configured to dispose the object in the inspection zone with the base wall positioned according to a predetermined orientation relative to the feed plane,
   wherein the imaging device is oriented along an inspection axis and wherein the apparatus comprises a deflecting system, the deflecting system being configured to intercept infrared rays emitted by the side wall of the object and inclined relative to the inspection axis and is configured to deflect the infrared rays in such a way as to reduce their inclination relative to the inspection axis.

2. The apparatus according to claim 1, wherein the deflecting system includes a first deflector and a second deflector and wherein the first deflector is configured to intercept the infrared rays emitted by the side wall of the object and to deflect them onto the second deflector which is configured to further deflect the infrared rays in such a way as to direct them at the imaging device.

3. The apparatus according to claim 2, wherein the first deflector and the second deflector are axisymmetric bodies whose axis of symmetry is aligned with the inspection axis and wherein the first deflector surrounds the second deflector in a plane perpendicular to the inspection axis.

4. The apparatus according to claim 3, wherein the first deflector includes a respective smooth reflective surface, surrounding the inspection axis and converging on the inspection axis in an emission direction, oriented from the inspection zone to the imaging device, and wherein the second deflector includes a smooth reflective surface, surrounding the inspection axis and converging on the inspection axis in the emission direction.

5. The apparatus according to claim 1, comprising a thermal conditioning system including:
   a thermometer configured to measure the temperature of the inspection zone;
   a control unit, configured to compare the temperature of the inspection zone with a reference temperature and to generate thermal conditioning signals as a function of the comparison.

6. The apparatus according to claim 5, comprising an insulation system including at least one wall surrounding the inspection zone to insulate the inspection zone.

7. The apparatus according to claim 1, comprising an emitting source, configured to irradiate the object in the inspection zone with an infrared light beam including wavelengths of between 2 μm and 5 μm.

8. The apparatus according to claim 7, wherein the emitting source is a LED light source.

9. The apparatus according to claim 1, comprising an interference filter configured to filter light waves directed at the camera to block light waves whose wavelength is less than 2 μm or greater than 5 μm.

10. The apparatus according to claim 1, comprising a fixed lens, connected to the imaging device and configured to operate on wavelengths of between 2 μm and 5 μm.

11. An apparatus for inspecting an object, where the object is made up of a first layer of plastic material and a second layer of EVO or EVOH and has a base wall and a side wall which is inclined relative to the base wall, the apparatus comprising:

an inspection zone in which the object can be placed for inspection;

a conveyor for feeding the object to the inspection zone along a feed plane;

an imaging device configured to view the object positioned in the inspection zone, to capture infrared rays having a wavelength of between 2 µm and 5 µm and to generate an image of the object as a function of the infrared rays;

a processor, connected to the imaging device to receive the images generated and configured to process the images, to inspect the second layer;

a thermal conditioning system including a thermometer, configured to measure the temperature of the inspection zone, and a control unit, configured to compare the temperature of the inspection zone with a reference temperature and to generate thermal conditioning signals as a function of the comparison, and a deflecting system configured to divert the infrared rays that do not fall within a field of vision of the imaging device and direct them into the field of vision of the imaging device, thus allowing them to be captured by the imaging device.

12. The apparatus according to claim 11, wherein the thermal conditioning system further includes a heater, configured to vary the temperature of the inspection zone as a function of the thermal conditioning signals.

13. The apparatus according to claim 11, comprising a thermal insulation system including at least one wall surrounding the inspection zone to thermally insulate the inspection zone.

14. A method for inspecting an object, where the object is made up of a first layer of plastic material and a second layer of EVO or EVOH and has a base wall and a side wall which is inclined relative to the base wall, the method comprising the following steps:

feeding the object to an inspection zone along a feed plane, wherein the base wall of the object is disposed in the inspection zone according to a predetermined orientation relative to the feed plane;

capturing infrared rays having a wavelength of between 2 µm and 5 µm, using an imaging device;

generating an image of the object as a function of the infrared radiation captured;

processing the image, using a processor, to inspect the second layer of the object, and a deflecting step, wherein the imaging device is oriented along an inspection axis and wherein infrared rays emitted by the side wall of the object are diverted so as to reduce their inclination relative to the inspection axis.

15. The method according to claim 14, comprising a step of irradiating the object in the inspection zone through an emitting source, wherein the emitting source irradiates the object with a light beam having a wavelength of between 2 µm and 5 µm.

16. The method according to claim 14, comprising a step of thermal conditioning, including the following steps:

measuring the temperature of the inspection zone using a thermometer;

comparing the temperature of the inspection zone with a reference temperature;

generating thermal conditioning signals as a function of the result of the step of comparing.

17. The method according to claim 16, wherein the thermal conditioning further includes a step of varying the temperature of the inspection zone, using a heater, as a function of the thermal conditioning signals.

18. The method according to claim 14, comprising a step of thermally insulating the inspection zone through a wall surrounding the inspection zone.

* * * * *